(12) United States Patent
Cudmore

(10) Patent No.: US 10,264,735 B2
(45) Date of Patent: *Apr. 23, 2019

(54) COMPOSTING GARDEN CONTAINER

(71) Applicant: Colin Cudmore, Bloomington, IN (US)

(72) Inventor: Colin Cudmore, Bloomington, IN (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/232,236

(22) Filed: Aug. 9, 2016

(65) Prior Publication Data

US 2017/0086386 A1 Mar. 30, 2017

Related U.S. Application Data

(63) Continuation of application No. 13/606,803, filed on Sep. 7, 2012, now Pat. No. 9,474,214.

(60) Provisional application No. 61/573,537, filed on Sep. 8, 2011.

(51) Int. Cl.
| | |
|---|---|
| *A01G 9/02* | (2018.01) |
| *C12M 1/02* | (2006.01) |
| *C05F 17/02* | (2006.01) |
| *A01G 27/00* | (2006.01) |
| *A01G 27/02* | (2006.01) |
| *C05F 17/00* | (2006.01) |

(52) U.S. Cl.
CPC ........... *A01G 9/023* (2013.01); *A01G 27/005* (2013.01); *A01G 27/02* (2013.01); *C05F 17/02* (2013.01); *C05F 17/0205* (2013.01); *C05F 17/0258* (2013.01); *C05F 17/0063* (2013.01); *Y02P 20/145* (2015.11); *Y02W 30/43* (2015.05)

(58) Field of Classification Search
CPC .............. C05F 17/0205; C05F 17/0258; C05F 17/027; C05F 17/02; C05F 17/0063
USPC ...................... 435/290.1–290.4, 292.1; 47/83
See application file for complete search history.

(56) References Cited

U.S. PATENT DOCUMENTS

| | | |
|---|---|---|
| 262,335 A | 8/1882 | Wagner |
| 1,740,057 A | 12/1929 | Babich |
| 1,993,631 A | 3/1935 | Smith |
| 3,293,798 A | 12/1966 | Johnson, Sr. |

(Continued)

*Primary Examiner* — Michael L Hobbs
(74) *Attorney, Agent, or Firm* — Woodard, Emhardt, Henry, Reeves & Wagner, LLP

(57) ABSTRACT

A planter in the form of a tower planter having an internal vertical composting capability is provided. The planter has a hollow, vertical, outer cylindrical barrel with a plurality of openings formed about its cylindrical side. A hollow inner cylindrical composting tube having a plurality of perforations formed in its cylindrical wall is provided. The space formed between the inner tube and barrel wall is filled with growing medium such as potting soil. The inner tube is filled with compost material. A plurality of worms is added to the inner tube compost material. Water is added to the inner tube and barrel on a daily basis. Plants are inserted into the outer barrel side openings. A removable container is placed at the bottom of the tube and barrel, said container adapted to capture water draining out from the tube and barrel, as well as periodically receiving compost from the compost tube. The key feature of the present invention is an interior vertical perforated chamber within a vertical exterior chamber in which garden plants are grown. The interior chamber provides a composting means, which provides compost that may be recovered and used in other planting environments.

19 Claims, 2 Drawing Sheets

(56) References Cited

U.S. PATENT DOCUMENTS

| | | | |
|---|---|---|---|
| 4,419,843 A | | 12/1983 | Johnson, Sr. |
| 4,683,674 A | | 8/1987 | Faul |
| 5,031,359 A | | 7/1991 | Moffett, Jr. |
| 5,413,934 A | * | 5/1995 | Fischer ............... C05F 17/0205 |
| | | | 220/908 |
| 5,428,922 A | | 7/1995 | Johnson |
| 5,438,797 A | | 8/1995 | Lendel |
| 5,450,692 A | | 9/1995 | Ruibal |
| 5,555,676 A | | 9/1996 | Lund |
| 6,840,008 B1 | | 1/2005 | Bullock et al. |
| 8,250,804 B2 | | 8/2012 | Chang |
| 9,474,214 B2 | * | 10/2016 | Cudmore ............... A01G 9/023 |
| 2003/0089037 A1 | | 5/2003 | Ware |
| 2010/0037517 A1 | | 2/2010 | Copping et al. |

\* cited by examiner

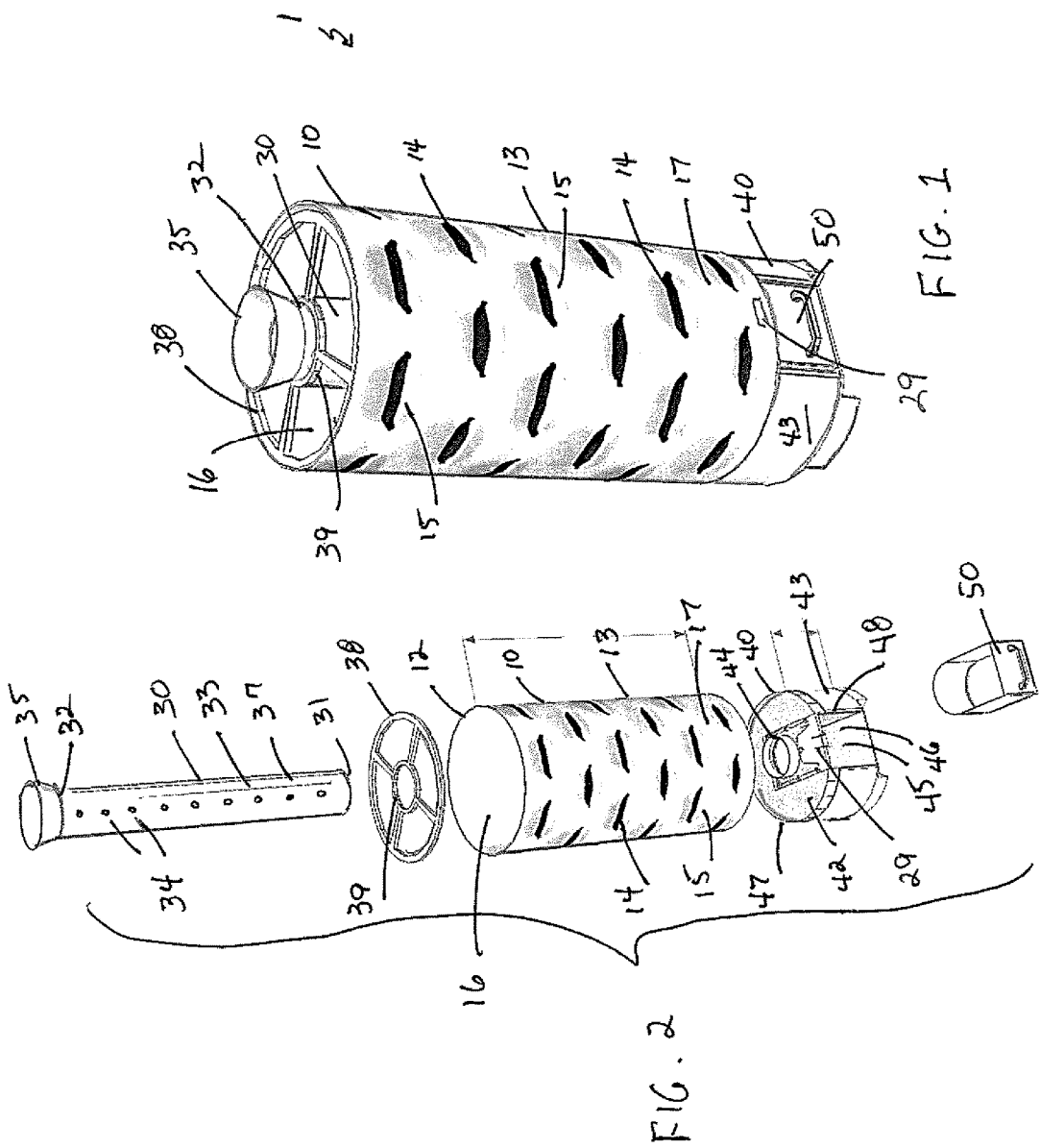

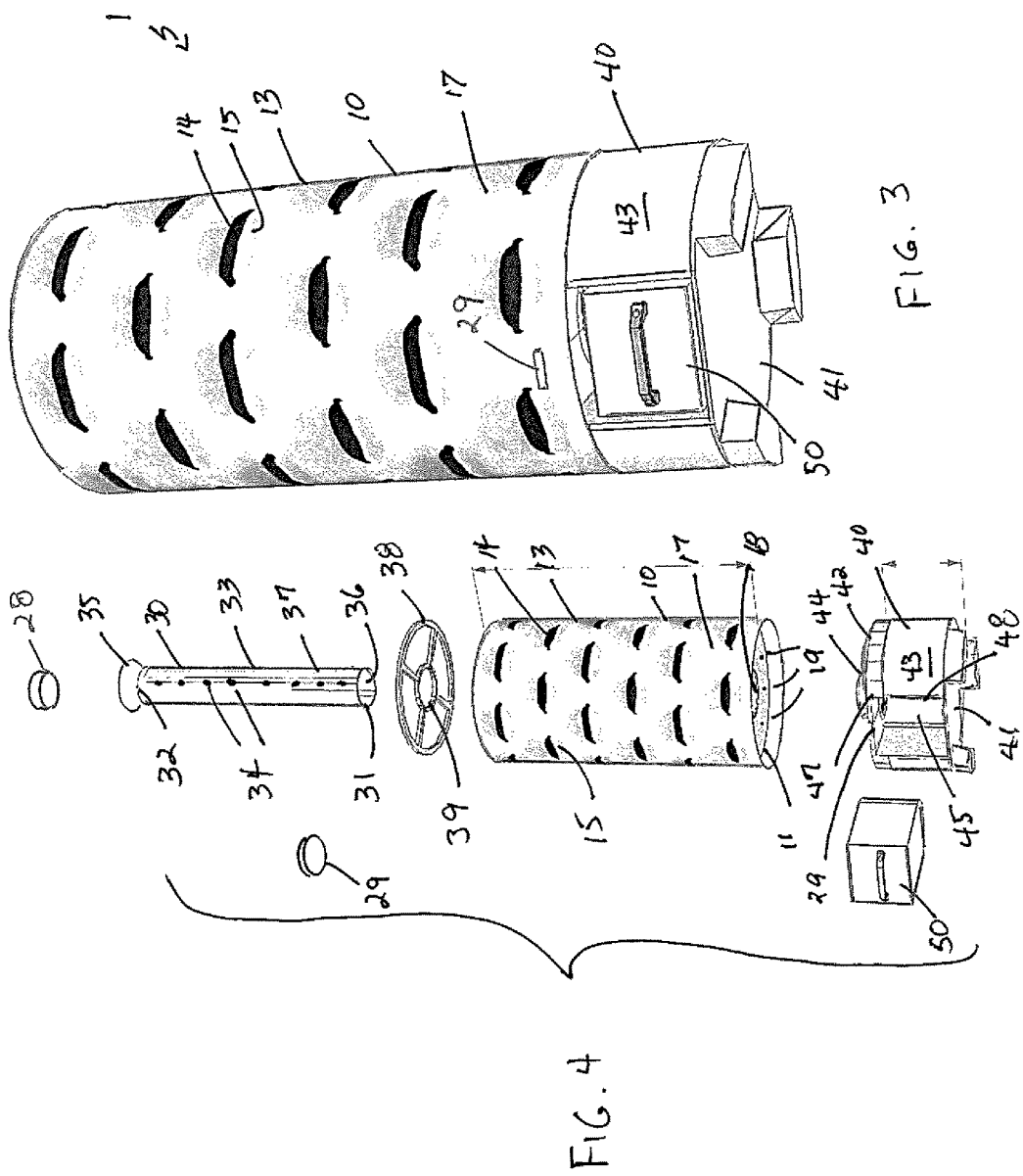

COMPOSTING GARDEN CONTAINER

CROSS-REFERENCE TO RELATED APPLICATIONS

This application claims priority to U.S. application Ser. No. 13/606,803, filed Sep. 7, 2012 (now issued as U.S. Pat. No. 9,474,214), which is entitled to and claims the priority benefits of U.S. Provisional Patent Application No. 61/573,537, filed Sep. 8, 2011.

BACKGROUND OF THE INVENTION

This invention relates to gardening, and in particular, to container gardening in the form of a garden tower planter with an internal vertical composting tube.

Container gardening is well known in the prior art. Almost any plant can be grown in a container when proper growing conditions are provided. Plants can be grown in anything that will hold soil and allow proper drainage. The criteria used for selecting containers typically include making sure that the container has a hole for adequate drainage and that the container is large enough to hold the minimum amount of soil required for mature plants to grow in. The biggest disadvantages to growing plants in containers are the maintenance requirements of watering and fertilizing.

SUMMARY OF THE INVENTION

The present invention overcomes the problems of the prior art by providing a planter in the form of a tower planter having an internal vertical composting capability. The present invention provides a hollow, vertical, outer cylindrical barrel with a plurality of openings formed about its cylindrical side. The present invention further provides a hollow inner cylindrical tube having a plurality of perforations formed in its cylindrical wall. The space between the inner tube and barrel wall is filled with growing medium such as potting soil. The inner tube is filled with compost material. A plurality of worms is added to the inner tube compost material. Water is added to the inner tube and barrel on a daily basis. Plants are inserted into the outer barrel side openings. A removable container is placed at the bottom of the tube and barrel, said container adapted to capture water draining out from the tube and barrel. The drainage water will be nutrient-rich and is poured back into the inner tube on a daily basis. The present invention converts a portion of the compost material into organic worm tea fertilizer to grow fast healthy plants. The key feature of the present invention is an interior vertical perforated chamber within a vertical exterior chamber in which garden plants are grown. The interior chamber provides a composting means which may be recovered and used in other planting environments.

These together with other objects of the invention, along with various features of novelty, which characterize the invention, are pointed out with particularity in the claims annexed hereto and forming a part of this disclosure. For a better understanding of the invention, its operating advantages and the specific objects attained by its uses, reference should be had to the accompanying drawings, claims and descriptive matter in which there is illustrated a preferred embodiment of the invention.

BRIEF DESCRIPTION OF THE DRAWINGS

FIG. 1 is a front top perspective view of a garden container constructed according to the principles of the present invention.

FIG. 2 is an exploded view of the garden container of FIG. 1.

FIG. 3 is a front bottom perspective view of the garden container.

FIG. 4 is an exploded view of the garden container of FIG. 3.

DETAILED DESCRIPTION OF INVENTION

Referring to the drawings in detail wherein like elements are indicated by like numerals, there is shown a garden container in the form of a garden tower 1 comprised of a vertical outer cylindrical barrel 10 with an inner concentric perforated cylindrical tube 30 (compost tube) positioned therein. The barrel 10 may rest on a base 40. The barrel 10 has a nominal diameter in the range of fourteen to thirty inches. The compost tube 30 has a nominal diameter equal to approximately one-third of the diameter of the barrel 10. The nominal longitudinal length of the barrel is thirty-six inches.

The barrel 10 has a bottom 11 from which a cylindrical side wall 13 extends vertically upward to an open top 12, said barrel being generally cylindrical in shape, the longitudinal axis of said barrel being generally perpendicular to the bottom of said barrel. The barrel top, bottom and sidewall define a barrel interior 16. The barrel sidewall 13 has a plurality of generally circumferential openings 14 formed therein, extending from the barrel interior through said barrel sidewall. Each opening 14 has a lower protruding lip 15 extending outward from a sidewall exterior 17. The barrel bottom 11 has a central circular aperture 18. The remainder of the bottom has a plurality of drainage holes 19 formed therein.

The compost tube 30 is concentrically positioned within the barrel interior 16. The compost tube 30 has an open bottom 31 from which a cylindrical sidewall 33 extends vertically upward to an open top 32, said compost tube being generally cylindrical in shape, the longitudinal axis of said compost tube being generally perpendicular to the bottom of said compost tube. The compost tube top, bottom and sidewall define a compost tube interior 36. The compost tube sidewall 33 has a plurality of perforations 34 formed therein, extending from the compost tube interior through said compost tube sidewall. The compost tube 30 is suspended within the barrel interior 16 by means of a ring 38 attached to the barrel top 12, said ring having an inner opening 39 gripping the compost tube side wall exterior 37 near to the compost tube top 32. The compost tube bottom 31 fits over or into the barrel bottom central circular aperture 18. The compost tube top 32 may have a removable funnel 35 inserted therein while adding material and water to the compost tube. The compost tube top 32 may then be capped, by a removable cap to keep flies, etc., out. The compost tube bottom 31 is sealed with a slidable gate 29. The gate 29 normally closes the compost tube bottom 31. When the gate 29 is slid away from the compost tube bottom 31, compost within the compost tube interior 36 drops into the base drawer 50 described below.

The barrel bottom may rest on a base 40. The base 40 has a bottom 41 from which a cylindrical sidewall 43 extends vertically upward to a top 42, said base being generally cylindrical in shape, the longitudinal axis of said base being generally perpendicular to the bottom of said base, said base bottom, top and side wall defining a base interior 46. The base top 42 has a raised central annular section 44 opening into a cavity 45 within the base interior 46. The base top central annular section 44 is adapted to receive the compost tube bottom 31 or to be aligned with the barrel bottom circular aperture 18. The base top 42 also has an upwardly extending perimeter flange 47. The bottom of the barrel sidewall 13 is adapted to fit over the base top perimeter flange 74. The base sidewall 43 has a radial opening 48 extending into the base interior cavity 45. The base 40 is further comprised of a drawer 50 adapted to slide through the sidewall radial opening 48 into the base interior cavity 45. The base top 42 is further comprised of an aperture between the annular section 44 and the radial opening 48.

In operation, the compost tube 30 is filled with compost material such as vegetable and fruit scraps. One cup of worms is also added to the inner tube. The barrel interior 16 between the barrel sidewall 13 and the inner tube 30 is filled with a growing medium such as potting soil. Starter plants are added in each of the barrel sidewall openings 14. There are nominally forty-five openings 14 in the barrel sidewall 13. Five or more plants may be planted in the barrel top 12 around the inner tube top 32. Water is added to the compost tube 30 and barrel 10. The compost tube perforations 34 running the length of the compost tube allow the worms to travel between the compost tube and the potting soil. The worms feed on the compost material and leave worm castings (nutrient rich poop) behind. The unused water collects vital nutrients as it passes through compost-worm castings, becoming "worm tea" draining into the base drawer 50. The worm tea is then added to the normal watering cycle providing an organic fertilizer for the plants. When the compost tube 30 is full, the user may remove a portion of the compost by removing the gate 29 at the compost tube bottom 31, and forcing a desired amount out the compost tube bottom into the drawer 50, which may be recovered and used in other planting environments.

It is understood that the above-described embodiment is merely illustrative of the application. Other embodiments may be readily devised by those skilled in the art, which will embody the principles of the invention and fall within the spirit and scope thereof.

I claim:

1. A composting garden container, comprising:
    a hollow, vertical, outer barrel having a side wall extending vertically upward to an open top, said barrel having a longitudinal axis, said barrel sidewall defining a barrel interior, said barrel sidewall having a plurality of generally circumferential openings formed therein, extending from the barrel interior through said barrel sidewall;
    a base supporting the barrel, said base having a base sidewall around a base interior that communicates with said barrel interior;
    an inner, vertical, cylindrical compost tube concentrically positioned within said barrel interior, said compost tube having an open bottom connected to said base from which a cylindrical sidewall extends vertically upward to an open top, said compost tube defining a compost tube interior, said compost tube sidewall having a plurality of perforations formed therein, extending from the compost tube interior through said compost tube sidewall; and
    a gate slidably sealing said compost tube bottom.

2. The composting garden container of claim 1, wherein said compost tube is held within the barrel interior by a ring attached to the barrel top, said ring having an inner opening gripping a compost tube side wall exterior near to the compost tube top.

3. The composting garden container of claim 1, wherein said barrel includes a bottom surface having a circular aperture, and wherein the compost tube bottom fits with the barrel bottom circular aperture.

4. The composting garden container as recited in claim 3, wherein said base has a top with a raised annular section opening into the base interior, said annular section aligned with the barrel bottom circular aperture.

5. The composting garden container of claim 1, wherein said barrel includes a bottom surface having a plurality of drainage holes.

6. The composting garden container of claim 1, further comprising a removable funnel insertable into said compost tube top.

7. The composting garden container of claim 1, further comprising a cap removably attached to said compost tube top, wherein when said cap is removed said compost tube can receive compost material into said compost tube interior.

8. The composting garden container as recited in claim 1, wherein said base has a top with a raised annular section opening into the base interior, said annular section adapted to receive the compost tube bottom.

9. The composting garden container as recited in claim 1, wherein said base has a top with an upwardly extending perimeter flange, and wherein a bottom portion of the barrel sidewall is adapted to fit over said perimeter flange.

10. The composting garden container as recited in claim 1, wherein each barrel side wall opening has a lower protruding lip extending outward from a barrel sidewall exterior.

11. The composting garden container as recited in claim 1, further comprising an opening through the base sidewall communicating with the base interior, and a drawer adapted to slide through the opening in the base sidewall so that the drawer has an internal position in which at least part of the drawer is beneath at least one of the compost tube and the barrel interior, and wherein the drawer can be withdrawn from the base so that any matter in the drawer can be emptied.

12. A composting garden container, comprising:
    a hollow, vertical, outer barrel having a cylindrical side wall extending vertically upward to an open top, said barrel having a longitudinal axis, said barrel sidewall defining a barrel interior, said barrel sidewall having a plurality of generally circumferential openings formed therein, extending from the barrel interior through said barrel sidewall;
    a base supporting the barrel, said base having a base sidewall around a base interior that communicates with said barrel interior, wherein an opening in the base sidewall communicates with the base interior;
    an inner, vertical, cylindrical compost tube concentrically positioned within said barrel interior, said compost tube having an open bottom connected to said base from which a cylindrical sidewall extends vertically upward to an open top, said compost tube defining a compost tube interior, said compost tube sidewall having a plurality of perforations formed therein, extending from the compost tube interior through said compost tube sidewall; and
    a drawer adapted to slide through the opening in the base sidewall so that the drawer has an internal position in which at least part of the drawer is beneath at least one of the compost tube and the barrel interior, and wherein the drawer can be withdrawn from the base so that any matter in the drawer can be emptied.

13. The composting garden container of claim 12, wherein said barrel includes a bottom surface having a plurality of drainage holes.

14. The composting garden container as recited in claim 12, wherein the barrel has a bottom with a circular aperture, and the base top has a raised central annular section opening into a cavity within the base interior, said base top central annular section aligned with the barrel bottom circular aperture.

15. The composting garden container as recited in claim 12, wherein the compost tube has a diameter equal to approximately one-third of a diameter of the barrel.

16. A composting garden container as recited in claim 12, wherein the barrel has a bottom with a circular aperture, and the compost tube bottom fits with the barrel bottom circular aperture.

17. A composting garden container as recited in claim 12, further comprising:
   a removable funnel insertable into said compost tube top, and
   wherein said compost tube is adapted to receive at least one of compost material and water into said compost tube interior through said funnel when said funnel is inserted into said compost tube top.

18. A composting garden container as recited in claim 12, wherein:
   the base includes a top having a raised central annular section opening into a cavity within the base interior, said base top central annular section adapted to receive the compost tube bottom.

19. A composting garden container as recited in claim 12, wherein:
   at least one barrel side wall opening has a lower protruding lip extending outward from the barrel sidewall exterior.

* * * * *